(12) United States Patent
Hofmeister et al.

(10) Patent No.: US 12,343,924 B2
(45) Date of Patent: Jul. 1, 2025

(54) METHOD FOR MANUFACTURING A HEATABLE MEDIA LINE

(71) Applicant: Silnova GmbH, Rehau (DE)

(72) Inventors: Tobias Hofmeister, Schöneck (DE); Michael Stary, Marienkirchen an der Polsenz (AT); Peter Zielke, Adorf (DE)

(73) Assignee: SILNOVA GMBH, Rehau (DE)

( * ) Notice: Subject to any disclaimer, the term of this patent is extended or adjusted under 35 U.S.C. 154(b) by 143 days.

(21) Appl. No.: 18/024,588

(22) PCT Filed: Aug. 16, 2021

(86) PCT No.: PCT/EP2021/072701
§ 371 (c)(1),
(2) Date: Mar. 3, 2023

(87) PCT Pub. No.: WO2022/048894
PCT Pub. Date: Mar. 10, 2022

(65) Prior Publication Data
US 2023/0330914 A1  Oct. 19, 2023

(30) Foreign Application Priority Data

Sep. 3, 2020  (DE) .................. 10 2020 122 991.7

(51) Int. Cl.
*F16L 53/38* (2018.01)
*A47J 31/54* (2006.01)
(Continued)

(52) U.S. Cl.
CPC ........... *B29C 53/582* (2013.01); *A47J 31/542* (2013.01); *B29C 53/587* (2013.01); *B29C 53/84* (2013.01); *F16L 53/32* (2018.01); *F16L 53/38* (2018.01)

(58) Field of Classification Search
CPC ..................... F16L 53/38; H05B 2203/021
See application file for complete search history.

(56) References Cited

U.S. PATENT DOCUMENTS

| | | | | |
|---|---|---|---|---|
| 7,266,293 B1 * | 9/2007 | Dundas | .................. | F24H 1/105 |
| | | | | 392/479 |
| 2007/0212037 A1 * | 9/2007 | Koenekamp | ...... | H01M 8/04037 |
| | | | | 392/468 |

(Continued)

FOREIGN PATENT DOCUMENTS

| CN | 2760890 Y | 2/2006 |
|---|---|---|
| CN | 111603046 A | 9/2020 |

(Continued)

OTHER PUBLICATIONS

German Patent Office, Search Report in DE10 2020 122 991.7, dated Apr. 13, 2021.

(Continued)

*Primary Examiner* — Scott W Dodds
(74) *Attorney, Agent, or Firm* — Aird & McBurney LP

(57) ABSTRACT

The invention relates to a method for manufacturing a heatable media line (100), in particular for conducting and simultaneously reheating brewing water or a freshly brewed hot beverage (1) in a hot-beverage dispensing machine (1000). According to the invention, along a hose line (2), at least one heat transfer foil which homogenizes the heat transfer via the hose line surface and which is composed of a material with a thermal conductivity at 0° C. of λ>10 W/mK, preferably λ>50 W/mK, is wound onto the outside, and an electrical heating medium is applied to the heat transfer foil, which electrical heating medium serves for heating the hose line surface.

15 Claims, 3 Drawing Sheets

Figure 1:
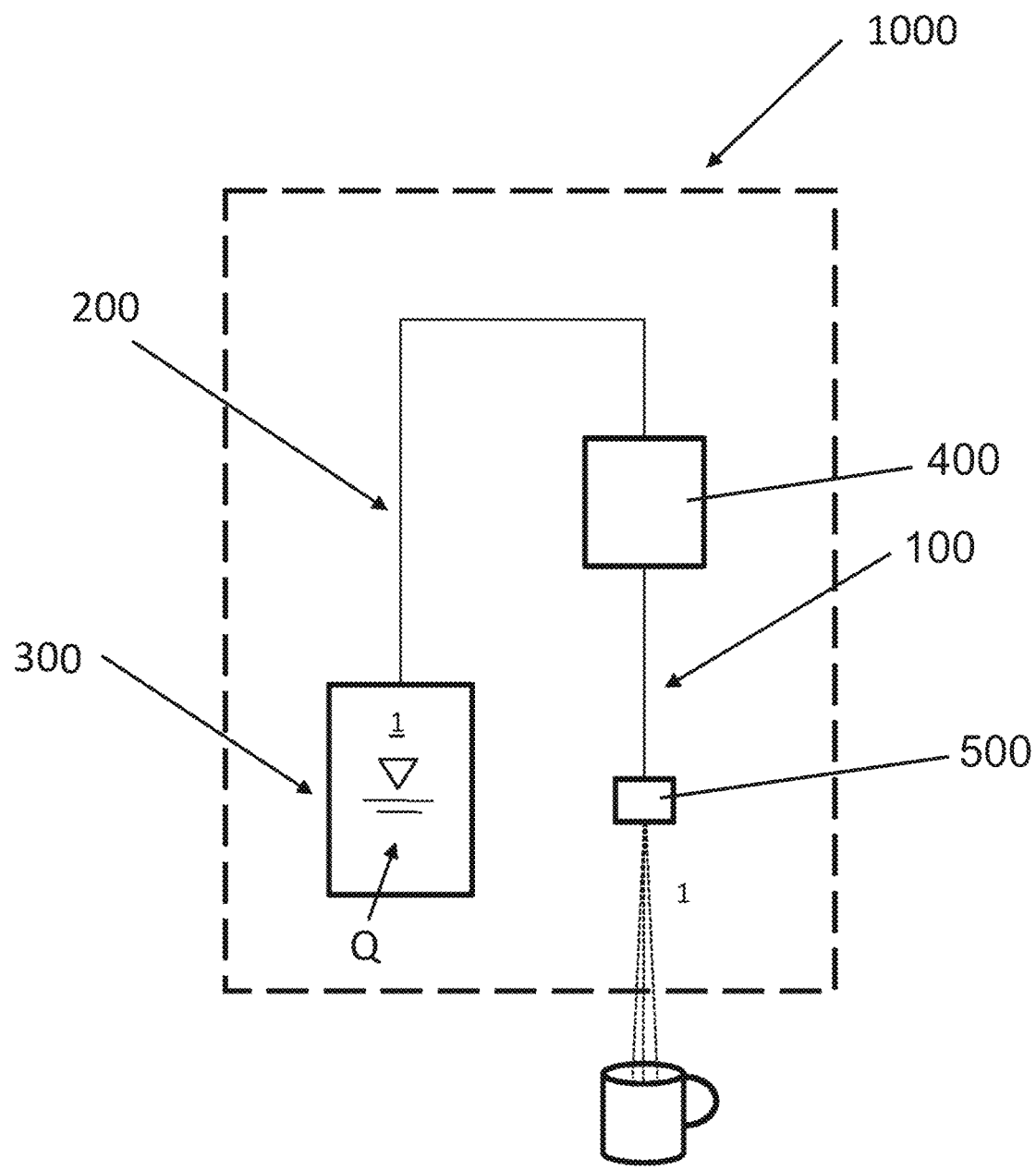

(51) Int. Cl.
*B29C 53/58* (2006.01)
*B29C 53/84* (2006.01)
*F16L 53/32* (2018.01)

(56) References Cited

U.S. PATENT DOCUMENTS

| | | | | |
|---|---|---|---|---|
| 2013/0152931 A1* | 6/2013 | Sims | ................ | A61M 16/0875 604/26 |
| 2014/0373954 A1* | 12/2014 | Smith | .................... | F16L 53/34 138/33 |

FOREIGN PATENT DOCUMENTS

| | | |
|---|---|---|
| DE | 2707244 A1 | 9/1978 |
| DE | 8712831 U1 | 11/1987 |
| DE | 102007009898 A1 | 9/2007 |
| DE | 102010033824 A1 | 3/2011 |
| DE | 102012109740 A1 | 4/2014 |
| DE | 202015104387 U1 | 11/2016 |
| EP | 2582273 B1 | 4/2013 |
| TW | 201129223 A | 8/2011 |
| WO | 2011023395 A1 | 3/2011 |

OTHER PUBLICATIONS

European Patent Office, International Search Report in PCT/EP2021/072701, dated Nov. 25, 2021.
European Patent Office, Written Opinion in PCT/EP2021/072701, dated Nov. 25, 2021.

\* cited by examiner

METHOD FOR MANUFACTURING A HEATABLE MEDIA LINE

The invention relates to a method for manufacturing a heatable media line, in particular for carrying and simultaneously reheating brewing water or a freshly brewed hot beverage in a hot beverage machine. The hot beverage can in particular be coffee that is prepared in a fully automatic coffee machine. A hot beverage machine, equipped for example with pads or capsules of preparation or with a filter that receives the product to be brewed, is just as suitable for the use of the media line manufactured in accordance with the invention, however, and the preparation of other hot beverages, such as tea for example, does not in principle preclude the use of the inventive teaching. Reheating can serve to heat the fluid back up to a temperature to which it had previously been heated in the machine, once it has travelled a certain distance through the machine, or to prevent the fluid from cooling down too quickly in the media line.

In the case of a fully automatic coffee machine, if it has cooled down after standing idle for a lengthy period, there is often the problem that, at the start of a brewing operation, the freshly brewed coffee dispensed from the machine is relatively cold, even though the brewing water used for the preparation was first heated correctly. This is because, at the start of the brewing operation, the heated brewing water is cooled down very quickly as it flows through components of the machine that initially are at room temperature or through cold water still remaining in the machine. An undesirable cooling can also occur in the media line itself, downstream of the brewing unit of the machine, for example. This means that the first cup of coffee drawn from the machine is often not hot enough to ensure an unreserved enjoyment of the coffee. It should be mentioned at this point that the invention is not limited to the use of the correspondingly manufactured media line in fully automatic coffee machines, but rather can also be used in principle in filter coffee machines and machines for the preparation of tea or other hot beverages, for example.

The incorporation of a locally restricted, separate heating device in the form of a continuous-flow heater in the corresponding media line downstream of the brewing unit of a coffee machine is known from EP 2 582 273 B1. This is relatively complicated in design terms, however, and also requires the heating device to have a very high heating capacity in order to allow for a sufficient energy input even in the very short time it takes for the brewing water to flow through the continuous-flow heater.

Moreover, heatable thermoplastic media lines for transporting a urea-water solution for exhaust gas aftertreatment, which are heated by way of heating wires wound helically around the outside of the media line, are known in the automotive sector, e.g. from DE 20 2015 104 387 U1.

The problem addressed by the invention is that of providing a method for manufacturing a heatable media line, in particular for carrying and simultaneously preheating brewing water or freshly brewed coffee in a fully automatic coffee machine, which on the one hand is cost-effective to manufacture and, on the other, allows for an effective reheating of the brewing water flowing through it.

Proceeding from a method having the features described in the introduction, this problem is solved in accordance with the invention in that at least one heat transfer foil is wound along the outside of a hose line, evening out the transfer of heat over the hose line surface and made of a material having a thermal conductivity at 0° C. of $\lambda>10$ W/mK, preferably $\lambda>50$ W/mK, e.g. $\lambda>100$ W/mK or $\lambda>200$ W/mK, and an electric heating medium, which serves to heat the hose line surface, is applied to the heat transfer foil. In terms of flow, the media line manufactured in accordance with the invention can be located downstream of the brewing unit for the preparation of coffee in the machine, in other words it can serve to carry and reheat the freshly brewed coffee. Alternatively, however, it is also possible to arrange the media line upstream of the brewing unit in terms of flow. It is also within the scope of the invention to combine the two aforementioned alternatives, in other words to provide a media line manufactured in accordance with the invention both upstream and downstream of the brewing unit in terms of flow. The inventive teaching provides a media line which is cost-effective to manufacture and is suitable for the applications described, which in particular exhibits an appropriate thermal stability and allows for an effective reheating of the freshly brewed coffee or of the brewing water, especially in the initial phase of the brewing operation, in which the issue described above regarding the inadequate temperature of the coffee beverage leaving the machine is of particular importance. At the same time, even after a relatively long operating period of the machine, which can be accompanied by calcification, for example, and hence a deterioration in the transfer of heat from the heater of the machine to the brewing water to be heated, the reheating can extend the period of time for which the coffee beverage is still dispensed from the machine at a satisfactory temperature, such that descaling the machine, for example, is no longer as urgent as before. The inventive combination of a heat transfer foil having very good thermal conductivity properties and the heating medium applied along the hose line permits a very even temperature rise over a long flow distance of the coffee or brewing water, allowing for an efficient heat input and hence a significant reheating. This enables the fluid flowing through the hose line to be reheated to a considerable extent by way of a relatively simple design, such that in particular, even after the fully automatic coffee machine has been idle for a lengthy period, the first freshly brewed cup of coffee is at a satisfactorily high temperature, thus ensuring an unreserved enjoyment of the coffee. Moreover, due to the helical winding of the heating medium, it is advantageously possible to install the media line in the machine without kinking, even with small bending radii, of <40 mm for example, in particular <30 mm. The hose line is expediently manufactured by way of an extrusion process. Overall, a substantially more effective and structurally simpler reheating of the brewing water or of the freshly brewed coffee is possible using the teaching according to the invention than is the case based on the teaching according to EP 2 582 273 B1, for example.

The heat transfer foil expediently consists of a metallic material, preferably aluminum or copper. The layer thickness of the heat transfer foil is preferably at most 100 μm, for example at most 50 μm, e.g. at most 30 μm. This allows for a uniform heat input into the hose line, even if the windings of the heating medium are spaced comparatively far apart. Moreover, the layer thickness of the heat transfer foil is preferably at least 5 μm, e.g. at least 10 μm, to ensure a certain mechanical robustness of the foil. Viewed in cross-section, the width of the foil is generally at least 100 times greater than the thickness, expediently at least 500 times greater.

It is within the scope of the invention for the heating medium to be applied after winding the heat transfer foil, in other words in a separate manufacturing step. Alternatively, however, it is also possible for the heating medium to be applied to the heat transfer foil before winding, such that a preformed composite structure comprising foil and heating medium is wound onto the surface of the hose line. Expediently, the winding of the heat transfer foil and/or of the heating medium takes place helically along the axis of the hose line. As a general rule, both the heating medium and the heat transfer foil are wound in the same direction, as is necessarily the case with a helical winding of the composite structure described above. However, if the heating medium is wound in a separate manufacturing step after winding the heat transfer foil, it can be expedient for the heat transfer foil to be wound in the opposite direction to the heating medium. It is possible in this way to guard against a possible axial slippage of the individual windings of the heat transfer foil after extended use of the media line. Moreover, it is within the scope of the invention for the individual windings of the at least one heat transfer foil to overlap at the edges, e.g. with an overlap width of at least 1 mm, preferably at least 2 mm, e.g. 1 to 10 mm, in particular 2 to 5 mm. However, the windings of the at least one heat transfer foil can also be spaced apart, preferably evenly, axially along the hose line. In order to withstand the thermal loading from the flow of boiling hot water or of superheated steam over the long term, the hose line expediently contains silicone, or the hose line consists of silicone.

The electric heating medium can comprise at least one heating wire, e.g. at least two heating wires spaced apart, preferably evenly, axially along the hose line, preferably with a circular cross-section. If only one heating wire is provided, in this case too the individual windings of this heating wire are advantageously spaced evenly apart from one another axially along the hose line. The diameter of the circular cross-section is expediently 0.5-1.5 mm. Alternatively or in combination, the heating medium can comprise at least one heating foil, e.g. at least two heating foils offset with respect to one another axially along the hose line, which again are optionally arranged axially spaced apart from one another, preferably evenly. If only one heating foil is provided, the individual windings of this heating foil are again spaced apart from one another, preferably evenly, axially along the hose line. However, it is also in principle within the scope of the invention for the windings of the at least one heating foil to overlap at the edges, such that in particular the heating medium forms a closed surface. Viewed in cross-section, the width of the heating foil is generally at least ten times greater than the thickness, expediently at least 20 times greater. The thickness of the heating foil is 0.2-0.8 mm, for example.

To improve the adhesion to the surface of the hose line, the heat transfer foil is preferably designed such that the side facing the hose line surface is self-adhesive. The use of a heat transfer foil that is self-adhesive on both sides or only on the outside is also possible, in order to improve the adhesion of the heating medium to the heat transfer foil (e.g. after removing a release liner from the outside of the heat transfer foil). Alternatively, an adhesive layer can also be applied to the hose line surface before the heat transfer foil is wound onto it.

It is also within the scope of the invention for the heat transfer foil to be provided on the outside with a coating, preferably made of a polymer, which enables the heating medium to be welded onto the heat transfer foil. This welding process can take place using ultrasound, for example.

The hose line itself has an outside diameter of 5 to 15 mm, for example, preferably 7 to 12 mm. The wall thickness of the hose line is preferably 0.5 to 2 mm, in particular 0.8 to 1.5 mm. The media line, which is preferably installed in a fully automatic coffee machine, is generally relatively short and has a maximum length of 50 cm, in particular at most 30 cm, e.g. at most 25 cm.

A preferably polymeric protective layer is expediently applied to the outside of the heating medium. This protective layer serves firstly for the mechanical protection of the often highly sensitive heating medium and secondly for thermal insulation and electrical isolation. A suitable example of a material is a thermoplastic material, e.g. a suitably thermally resistant PA, or an elastomer, e.g. silicone, for example liquid silicone rubber (LSR). The protective layer can be applied by way of an extrusion process. It is also within the scope of the invention for the material of the protective layer to be expanded, in order thereby to improve the heat insulation properties and also the electrical isolation effect. The protective layer can be made relatively thin, e.g. with a layer thickness of at most 2 mm, in particular at most 1 mm. However, given the preferably relatively short length of the media line, it can also be expedient to apply the protective layer by injection molding. In particular, if the media line is arranged upstream of the brewing unit of the fully automatic coffee machine in terms of flow, it can further be expedient, in view of the prevailing overpressure of the brewing water at that point (e.g. more than 5 bar above atmospheric pressure), to provide the media line with a reinforcing layer, made for example of wound and/or braided filaments. This reinforcing layer is expediently applied to the protective layer, wherein the reinforcing layer can in turn be surrounded by a polymeric, preferably extruded or injection molded, outer layer, made of PA for example. The filaments can all be made of the same materials or alternatively also of different materials. It is thus within the scope of the invention, for example, for multiple filaments made of different materials to together form individual strands and for these strands to be braided or wound together to produce the reinforcing layer. In this case, an individual strand can contain filaments of different polymers, e.g. polyester on the one hand and aramid on the other. It is also within the scope of the invention to bond the reinforcing layer to the layer beneath it.

It is also within the scope of the invention for the hose line surface to be heated, during the process of manufacturing the media line, in the contact region of the heat transfer foil and thus locally to be thermally decomposed and/or fully vulcanized, such that the adhesion of the heating medium to the hose line surface is improved. If a silicone hose line is used, deformation is possible when the silicone material is not yet fully vulcanized. Thus, on the one hand, with an appropriately intense local application of heat, the hose line surface can be selectively thermally decomposed in the regions in which the heat transfer film is resting on the surface. Surprisingly, this selective local decomposition increases the attachment of the foil to the surface of the hose line, such that overall this measure improves the adhesion of the foil to the hose line surface. Even in extended use, for example, this ensures a consistent, even helical winding of the heat transfer foil for an optimal transfer of heat over the long term. The thermal decomposition and/or deformation of the hose line surface is preferably brought about by the winding of the heat transfer foil. A desired thermal decomposition causes a correspondingly intense heating of the heat transfer foil. It has proved to be particularly advantageous in this case for this heating to take place by ultrasonic irradiation of the foil or by passing current through the heating medium itself, preferably before the winding operation. The hose line surface is expediently heated locally to a temperature above 250° C., in particular above 300° C., preferably above 400° C. At temperatures of approximately 250° C., silicone resin begins to decompose, forming silicic acid. Surprisingly, in the case of a silicone hose line, this can significantly improve the adhesion of the foil to the hose line surface. If the foil (and optionally the heating medium) is wound onto the as yet not fully vulcanized hose line surface, this may be plastically deformed by the winding operation. Vulcanization then takes place subsequently, expediently at temperatures of 150° C. to 200° C. Even a very gentle heating to e.g. over 50° C. is possible, since the vulcanization process also takes place in principle (slowly) at room temperature. The local heating of the hose line and/or the winding of the heat transfer foil and/or of the heating medium preferably gives rise to at least a local indentation on the hose line surface along the foil, into which the foil is embedded.

The subject matter of the invention is also a media line manufactured by the method according to the invention as described above, along with a machine for the preparation of hot beverages, particularly coffee, comprising such a media line.

Figure 2:
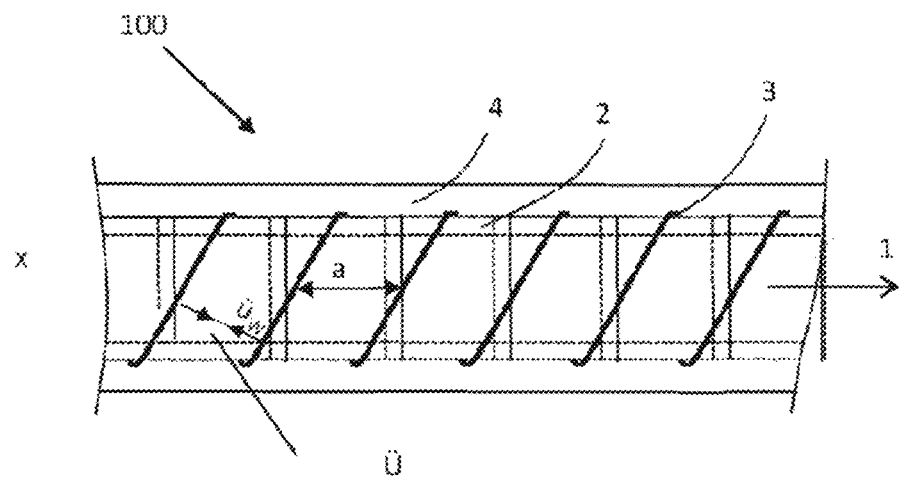
Figure 3:
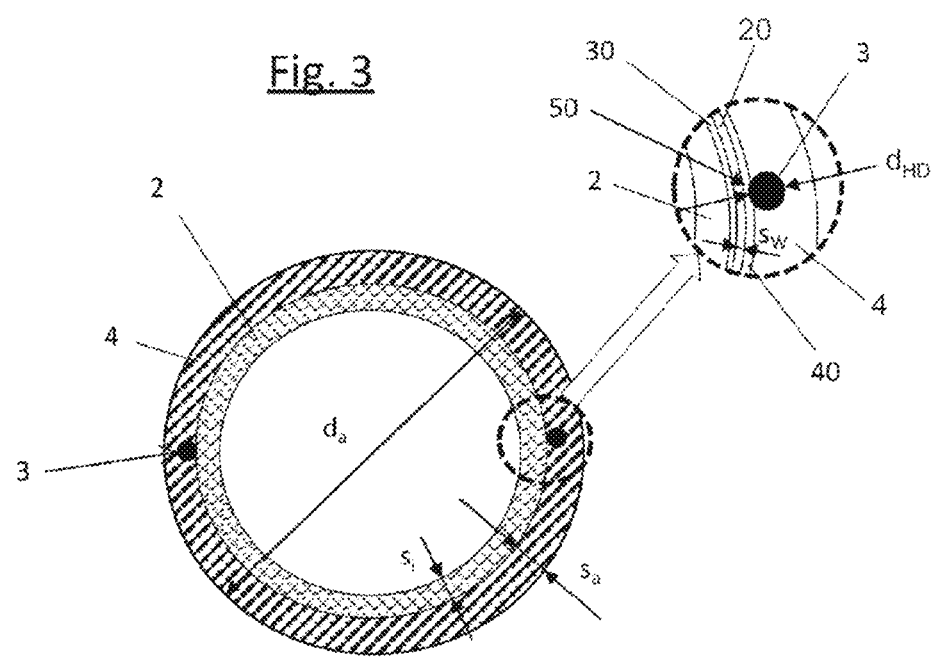
Figure 4:
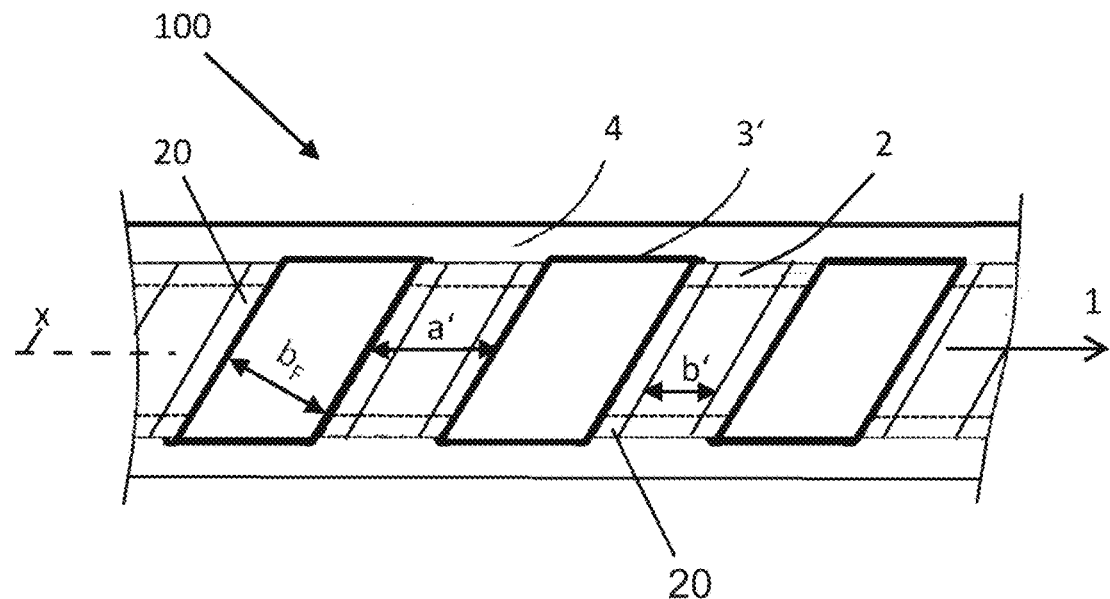
Figure 5:
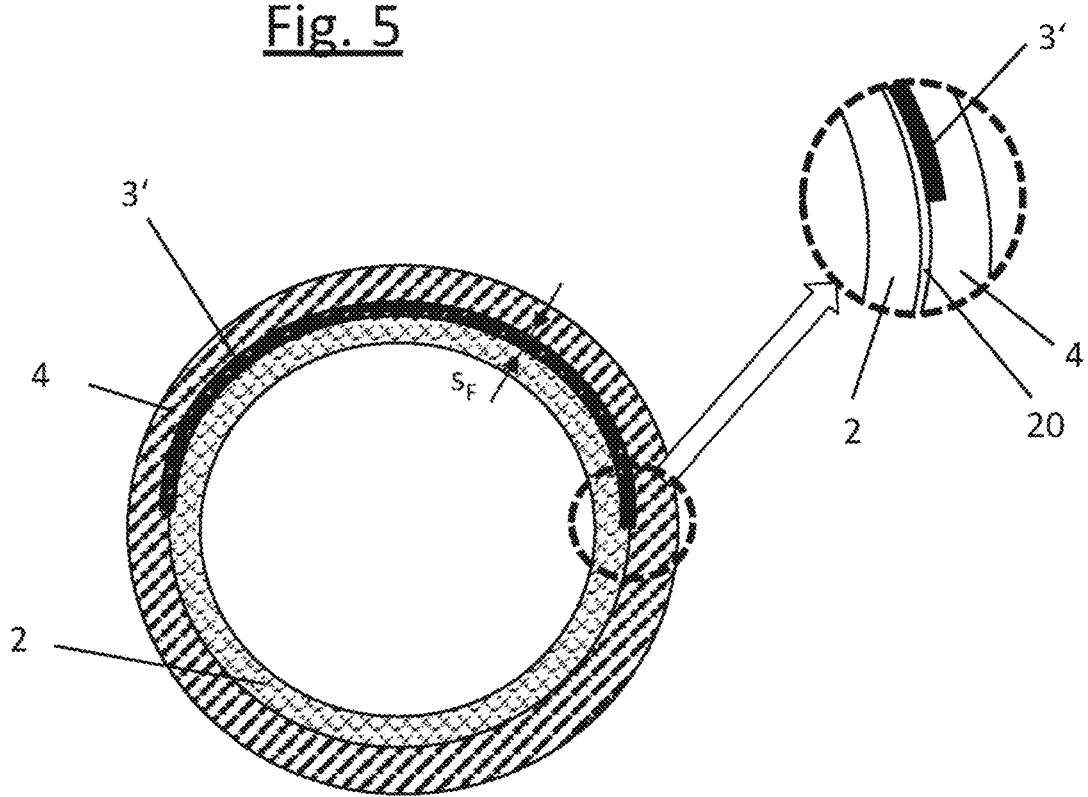

The invention is explained in detail below by reference to a drawing that represents just one exemplary embodiment. In the schematic figures:

FIG. 1 shows a schematic representation of a fully automatic coffee machine with a media line manufactured in accordance with the invention FIG. 2 shows a media line manufactured in accordance with the invention in a partial longitudinal view FIG. 3 shows a cross-sectional representation of the hose line shown in FIG. 2, and FIGS. 4, 5 show an alternative embodiment of the invention in a representation corresponding to FIG. 2 or 3

FIG. 1 shows a schematic representation of a machine for the preparation of hot beverages, in particular a fully automatic coffee machine 1000, with a media line 100 manufactured in accordance with the invention. The machine 1000 comprises, in addition to the media line 100, an electric heater 300 for producing boiling hot brewing water 1, which is carried through a transport line 200 to a brewing unit 400 of the machine 1000, in which ground coffee is brewed with the brewing water 1 to prepare hot coffee. This freshly prepared coffee 1 then flows from the brewing unit 400 through the media line 100 to the coffee dispensing unit 500 of the machine 1000, during which process it is reheated. In addition (or alternatively) to the line 100, the transport line 200 for transporting the brewing water 1 from the heater 300 to the brewing unit 400 can also be designed as a media line according to the invention.

FIG. 2 shows a partial longitudinal view of the electrically heatable media line 100 shown in FIG. 1, which serves to transport and simultaneously reheat the freshly brewed coffee 1 in the fully automatic coffee machine 1000. In the method according to the invention for the manufacture of such a media line 100, in the exemplary embodiment, an electric heating medium in the form of two electric heating wires 3 is wound helically onto the outside of a silicone hose line 2 along the longitudinal axis x of the hose line 2. Viewed in the axial direction, the heating wires 3 are arranged spaced evenly apart by length a. It can also be seen that, in order to manufacture the media line 100, two aluminum heat transfer foils 20 (thermal conductivity λ>200 W/mK at 0° C.) are wound helically along the outside of the hose line 2, a heating wire 3 being arranged on each foil 20. The heating wires 3 serve to heat the hose line 2 and hence the fluid 1 transported through the hose line 2, the transfer of heat from the heating wires 3 to the hose line surface by the heat transfer foils 20 being evened out over this surface. Each heat transfer foil 20 has a layer thickness $s_w$ of 10 to 40 μm. It can be seen that the windings of the heat transfer foils 20 overlap at the edges, the width $ü_w$ of the overlap regions Ü being 1 to 3 mm.

The winding of the heating wires 3 onto the heat transfer foils 20 can be carried out by way of a separate manufacturing operation after the foils have been wound onto the hose line surface. Alternatively, however, it is also possible for each heating wire 3 to be applied to a heat transfer foil 20, e.g. by gluing or welding, before a composite structure of the heating wire 3 and foil 20 is wound onto the hose line 2. In the exemplary embodiment, the heating wires 3 and the heat transfer foils 20 are wound in the same direction. If the heating wires 3 are applied only after the foils 20 have been wound onto the hose line 2, it is also possible in principle for the helical windings of wires 3 and foils 20 to run in opposite directions and to cross one another accordingly (not shown).

As can be seen in particular from the enlarged section on the right in FIG. 3, the heating wires 3 have a circular cross-section with a diameter do of 0.5 to 1.5 mm. The heat transfer foils 20 are designed such that the side facing the hose line surface is self-adhesive, and accordingly they have an adhesive layer 30 on that side, thereby improving the adhesion of the foils 20 to the hose line surface. Alternatively, a layer of glue can also be applied to the hose line 2 before the foils 20 are wound. Moreover, the heat transfer foils 20 have a polymeric coating 40 on the outside, which allows the heating wires 3 to be welded to the foils 20 (either before the foils 20 are wound onto the hose line 2 or afterwards), for example by ultrasonic heating of the heating wires 3 or by heating the heating wires 3 by passing an electric current through them. The welding of the heating wires 3 causes the material of the coating 40 to melt locally, such that an indentation 50 matching the contour of the heating wire 3 is formed in the coating 40 in the contact region of a heating wire 3. Alternatively, the layer 40 can also be formed as an adhesive layer.

A polymeric protective layer 4, made of polyamide for example, is applied to the outside of the heating wires 3, serving both for mechanical protection of the wires 3 and for thermal insulation, and having a layer thickness $s_a$ of 0.2 to 0.8 mm, for example. The hose line 2 itself has an outside diameter $d_A$ of 5 to 15 mm, preferably 7 to 12 mm. The wall thickness $s_i$ of the hose line 2 is preferably 0.5 to 2 mm, in particular 0.8 to 1.5 mm. The hose line 2 is relatively short and has a maximum length of 30 cm.

In the exemplary embodiment according to FIGS. 4 and 5, the heating medium is designed as an electric heating foil 3', which is likewise wound helically onto the hose line 2 along the hose line axis x. The width $b_F$ of the heating foil 3' viewed in cross-section is over 20 times greater than its thickness $s_F$, which is 0.2 to 0.8 mm. In the exemplary embodiment, only one heating foil 3' is wound onto the hose line 2. In this case, viewed in the axial direction, the individual windings of the heating foil 3' are arranged spaced evenly apart by length a'. The heating foil 3' in turn is applied to an aluminum heat transfer foil 20 which evens out the transfer of heat over the hose line surface. In this exemplary embodiment, the windings of the foil 20 are spaced apart from one another at the edges by length b', such that there are no overlap regions in this case.

If the media line is used to transport brewing water 1 to the brewing unit 400 of the fully automatic coffee machine 1000 (represented by the transport line 200 in FIG. 1), said media line, because of the high pressure prevailing there, is additionally provided with a reinforcing layer made of wound or braided filaments (not shown in the figure), which is in turn surrounded by a polymeric, preferably extruded outer layer, made of PA for example.

As an alternative to using the media line 100 manufactured in accordance with the invention in a fully automatic coffee machine 1000, it can also be used for example in simple coffee machines and in machines for preparing tea or other hot beverages.

The invention claimed is:

1. A method for manufacturing a heatable media line, wherein the method comprises:
   providing a coating made of a polymer on an outside of at least one heat transfer foil, wherein the at least one heat transfer foil is made of a material having a thermal conductivity at 0° C. of $\lambda > 10$ W/mK;
   applying an electric heating medium to the at least one heat transfer foil, wherein the applying comprises heating of the electric heating medium to cause melting of the polymer; and
   winding the at least one heat transfer foil along an outside of a hose line, for evening out a transfer of heat over a hose line surface of the hose line, wherein the electric heating medium is for heating the hose line surface.

2. The method according to claim 1, wherein the at least one heat transfer foil consists of a metallic material.

3. The method according to claim 1, wherein the at least one heat transfer foil has a layer thickness of at most 100 μm.

4. The method according to claim 1, wherein the applying of the electric heating medium to the at least one heat transfer foil takes place after the winding of the at least one heat transfer foil.

5. The method according to claim 1, wherein the applying of the electric heating medium to the at least one heat transfer foil takes place before the winding of the at least one heat transfer foil.

6. The method according to claim 1, wherein the winding of the at least one heat transfer foil and of the electric heating medium takes place helically along an axis of the hose line.

7. The method according to claim 6, wherein the at least one heat transfer foil is wound in an opposite direction to the electric heating medium.

8. The method according to claim 1, wherein the winding of the at least one heat transfer foil along the outside of the hose line produces individual windings of the at least one heat transfer foil, wherein the individual windings overlap at edges of the individual windings.

9. The method according to claim 1, wherein the hose line contains silicone or consists of silicone.

10. The method according to claim 1, wherein the electric heating medium comprises at least one heating wire and/or at least one heating foil.

11. The method according to claim 1, wherein the at least one heat transfer foil is self-adhesive on a side facing the hose line surface or on both sides.

12. The method according to claim 1, wherein the method further comprises applying a polymeric protective layer to an outside of the electric heating medium.

13. The method according to claim 1, wherein the heating of the electric heating medium comprises ultrasonic heating of the electric heating medium.

14. The method according to claim 1, wherein the heating of the electric heating medium comprises passing an electric current through the electric heating medium.

15. The method according to claim 1, wherein the melting of the polymer forms an indentation in a region of the polymer contacting the electric heating medium, wherein the indentation matches a contour of the electric heating medium.

* * * * *